Jan. 28, 1930.　　　A. S. HUGHES　　　1,744,830
HOIST
Filed Aug. 4, 1925　　2 Sheets-Sheet 1

WITNESSES
Chas. L. McDonald
E. N. Lovewell

INVENTOR
Arthur S. Hughes
BY E. G. Siggers
ATTORNEY

Jan. 28, 1930. A. S. HUGHES 1,744,830
HOIST
Filed Aug. 4, 1925 2 Sheets-Sheet 2

INVENTOR
Arthur S. Hughes
WITNESSES
Chas. L. McDonald
E. N. Lovewell
BY
ATTORNEY Patented Jan. 28, 1930

1,744,830

UNITED STATES PATENT OFFICE

ARTHUR SHERIDAN HUGHES, OF MANSFIELD, OHIO

HOIST

Application filed August 4, 1925. Serial No. 48,086.

This invention relates to a hoist, which is adapted to be used in connection with a truck chassis and body for tilting the latter to dump its load.

More specifically stated, the invention herein comprises an improved pawl and ratchet mechanism for automatically holding the body at any angle desired.

Figure 1:
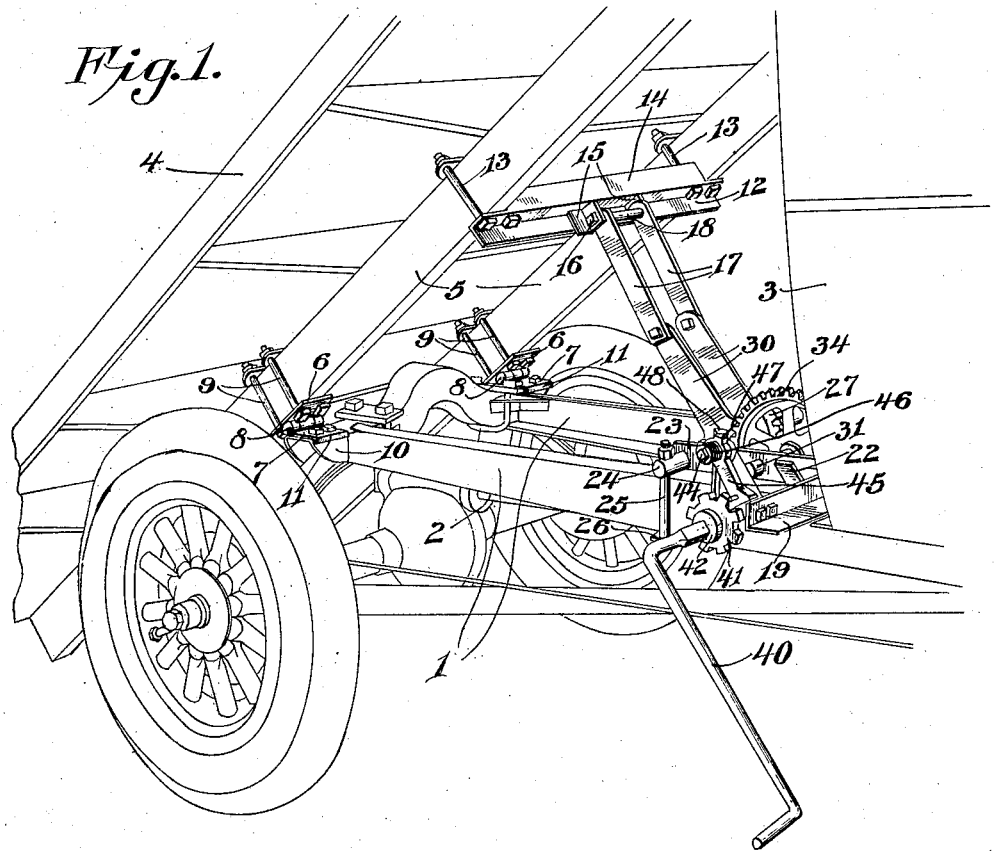
Figure 1 is a perspective view of an embodiment of the invention as applied to a chassis with a platform body.
Figure 4:
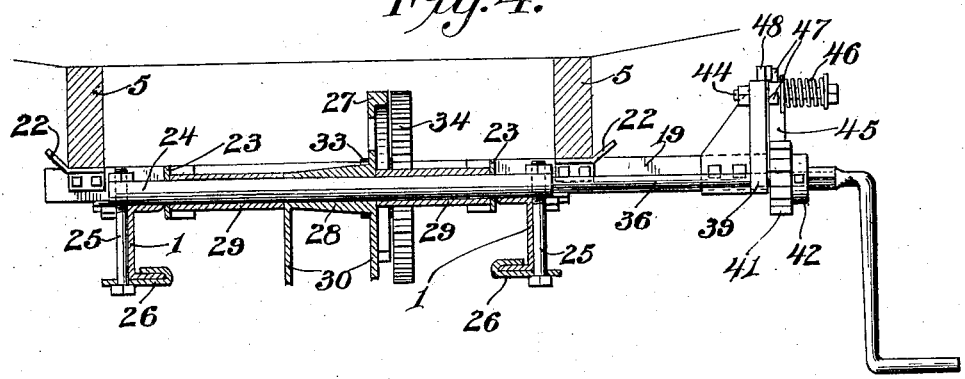
Figure 4 is a vertical section taken on the line 4—4 of Figure 3.
Figure 2:
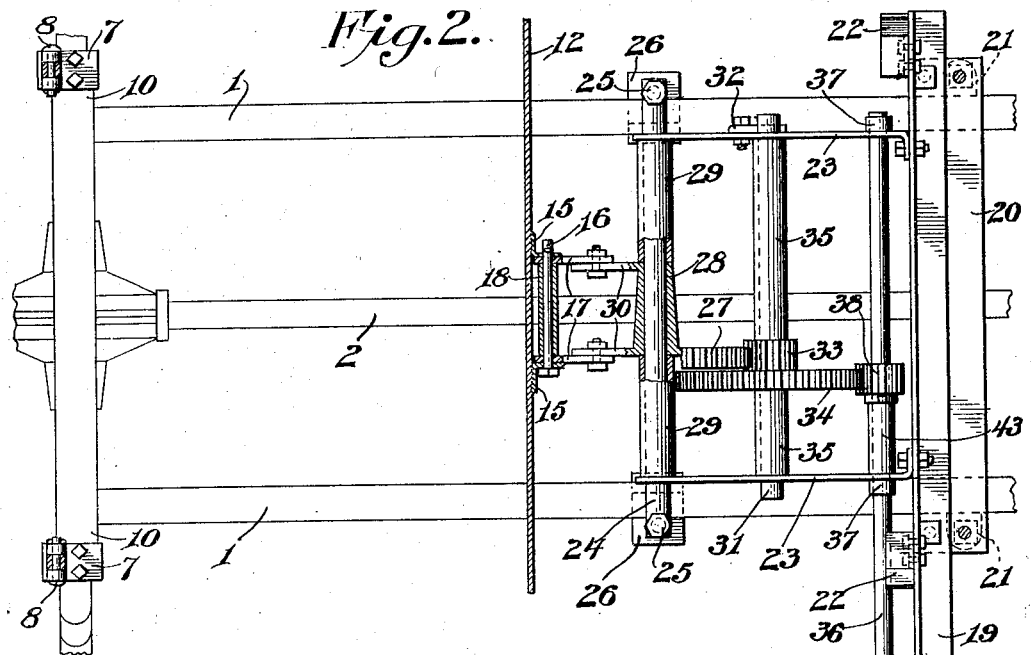
Figure 2 is a plan view of certain parts of the mechanism shown in Figure 1, other parts being shown in section.

The preferred embodiment of the invention is illustrated in connection with a truck chassis having longitudinal beams 1, midway between which is a transmission shaft housing 2, a cab 3 being secured to the front end of the chassis.

The body of the truck comprises a platform 4, beneath which are secured longitudinal beams 5. This platform body is connected to the chassis by a pair of hinges, each of which comprises an upper hinge member 6 and a lower hinge member 7 connected by a pintle 8. The upper hinge member is securely clamped to the beam 5 by means of bolts 9, and the lower hinge member is securely bolted to the projecting portion 10 of the chassis frame, and has at its front edge a downturned flange 11, which engages the front side thereof.

Toward the front end of the platform body, an angle bar 12 is secured transversely to the under sides of the beams 5 by means of bolts 13, and this angle bar is adjacent the lower flange of another angle bar 14, which extends between the beams 5 and is secured thereto as by welding. Angle irons 15 are welded, or otherwise secured, to the lower flange of the angle bar 12 in spaced relation to each other, and support a horizontal bolt 16 to which a pair of links 17 are connected. These links are held in spaced relation by a spacing sleeve 18 surrounding the bolt 16, and are actuated by means hereinafter described to raise the front end of the body to tilt it about its hinges to dump the load.

For supporting the dumping mechanism, an angle bar 19 rests transversely on the beams 1 in rear of the cab 3, and is secured to plates 20, which are held by the same bolts which engage the lugs 21 to bolt the cab to the chassis frame. Guiding lugs 22 are secured to the rear side of the angle bar 19 for receiving the front ends of the beams 5 when the platform body is in horizontal position.

Longitudinal bars 23 are secured at their front ends to the angle bar 19, and are supported at their rear ends on a round transverse bar or shaft 24, which is clamped to the longitudinal beams 1 by bolts 25, which are inserted through the ends of the shaft 24, and through clips 26 which are slipped over the lower flanges of the beams 1. A segment 27 is journaled on the shaft 24, and has an elongated hub 28 formed with radially projecting arms 30, which straddle the transmission shaft housing 2, and are pivotally connected to the lower ends of the links 17, so that by rotating the segment 27 the links 17 may be raised or lowered to tilt the platform 4, or to restore it to a horizontal position. The hub 28 is held against movement longitudinally of the shaft 24 by spacing sleeves 29.

An intermediate shaft 31 is mounted in the longitudinal bars 23, and its ends rest on the beams 1, the shaft being secured in position by an eye 32, which is connected to one end of the shaft, and is bolted to the adjacent bar 23. A pinion 33 is revolubly mounted on the shaft 31, and meshes with the segment 27. A gear 34 is integrally or otherwise secured to the pinion 33, and the pinion and gear are held against movement longitudinally of the shaft 31 by spacing sleeves 35.

A crank shaft 36 is journaled in bearings 37 secured to the bars 23 near the front ends thereof, and has a pinion 38 secured thereto which meshes with the gear 34. The outwardly projecting portion of the crank shaft 36 is journaled in a bearing member 39, which is secured to the outwardly extended portion of the channel bar 19. The crank shaft 36 may be rotated by means of a crank 40 attached to its outer end. A ratchet wheel 41 is mounted on the shaft 36 outside of the bearing member 39 and is provided with a collar 42 which is secured to the shaft. A spacing sleeve 43, mounted on the shaft 36 between the pinion 38 and one of the bars 23, prevents longtiudinal movement of the crank shaft in one direction, while the collar 42 prevents longitudinal movement in the other direction.

Figure 3:
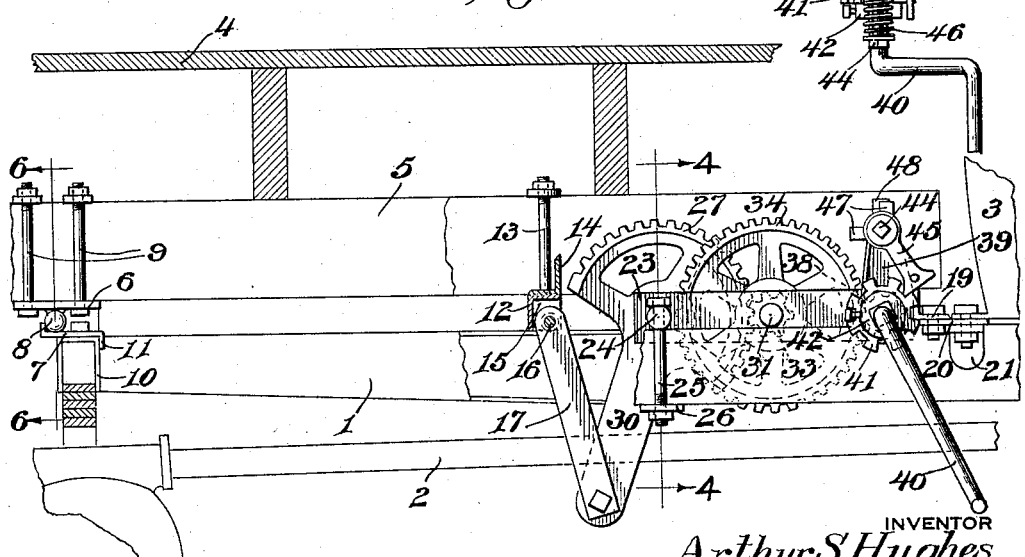
Figure 3 is a side elevation of the invention with parts broken away and other parts shown in section.

The bearing member 39 extends upwardly and supports a pin or bolt 44, on which a pawl 45 is pivotally supported. An expansile coil spring 46 on the bolt 44 urges the pawl 45 toward the bearing member 39. The hub of the pawl is formed with two lugs 47, either of which is adapted to engage the inclined surface of a lug 48 projecting upwardly from the bearing member 39. The pawl is reversible. When it is in the position shown in Figures 1 and 3, and the crank shaft 36 is rotated to tilt the body, the pawl will ride over the teeth of the ratchet wheel 41, and will automatically engage successive notches to prevent backward rotation of the shaft. When the platform is to be restored to horizontal position, the position of the pawl is reversed. In either position of the pawl, one of the lugs 47 is adapted to engage the inclined face of the lug 48, and the combined action of the spring 46 and the inclined face of the lug 48 automatically holds the pawl in its proper place. Without something of this kind, if the crank shaft were to be revolved rapidly, the pawl might be kicked over to reverse position and cause breakage.

While I have shown and described in detail the preferred construction of the invention, it is obvious that various modifications may be devised in the size, shape and relative arrangement of the various parts without any material departure from the essential features of the invention; it is my desire, therefore, to include all such modifications within the scope of the appended claims.

What is claimed is:

1. In a device of the character described, the combination of a bearing bracket, a shaft journaled therein, a ratchet wheel secured to the shaft, a pawl mounted to swing in a plane perpendicular to said shaft, said pawl and bracket having coengaging surfaces, a spring urging said pawl in the direction of its axis to cause the coengagement of said surfaces, said surfaces being inclined in a direction to urge said pawl into engagement with the ratchet wheel.

2. In a device of the character described, the combination of a bearing bracket, a shaft journaled therein, a ratchet wheel secured to the shaft, a pin mounted in the bracket and parallel to the shaft, a pawl having a hub journaled on said pin, projections on the hub and bracket respectively having mutually engaging surfaces, a spring engaging said hub and urging the same longitudinally of the pin to cause the engagement of said surfaces, said surfaces being inclined in a direction to urge the pawl into engagement with the ratchet wheel.

3. In a device of the character described, the combination of a bearing bracket, a shaft journaled therein, a ratchet wheel secured to the shaft, a pin mounted in the bracket parallel to the shaft, a reversible pawl journaled on said pin and having a hub with a pair of lugs projecting radially therefrom, a lug secured to the bracket and having oppositely disposed inclined faces, and a spring engaging said hub and causing one or the other of the lugs on said hub, according to the position of the pawl, to engage the corresponding inclined surface, whereby to urge the pawl into engagement with the ratchet wheel.

In testimony that I claim the foregoing as my own I have hereto affixed my signature.

ARTHUR SHERIDAN HUGHES.